United States Patent
Francis Knowles-Barley et al.

(10) Patent No.: US 12,293,569 B2
(45) Date of Patent: May 6, 2025

(54) SYSTEM AND METHOD FOR GENERATING TRAINING IMAGES

(71) Applicant: VOLPARA HEALTH TECHNOLOGIES LIMITED, Wellington (NZ)

(72) Inventors: Seymour Francis Knowles-Barley, Wellington (NZ); Ralph Highnam, Wellington (NZ)

(73) Assignee: Volpara Health Technologies Limited, Wellington (NZ)

(*) Notice: Subject to any disclaimer, the term of this patent is extended or adjusted under 35 U.S.C. 154(b) by 404 days.

(21) Appl. No.: 17/782,162

(22) PCT Filed: Dec. 2, 2020

(86) PCT No.: PCT/IB2020/061379
§ 371 (c)(1),
(2) Date: Jun. 2, 2022

(87) PCT Pub. No.: WO2021/111326
PCT Pub. Date: Jun. 10, 2021

(65) Prior Publication Data
US 2023/0017138 A1    Jan. 19, 2023

(30) Foreign Application Priority Data
Dec. 2, 2019 (GB) .................................. 1917578

(51) Int. Cl.
G06V 10/774   (2022.01)
G06T 7/00     (2017.01)
G06T 7/20     (2017.01)

(52) U.S. Cl.
CPC .......... *G06V 10/774* (2022.01); *G06T 7/0016* (2013.01); *G06T 7/20* (2013.01); *G06T 2207/20081* (2013.01)

(58) Field of Classification Search
CPC . G06T 2207/20081; G06T 2207/20084; G06T 7/0016; G06T 7/20; G06V 10/774
See application file for complete search history.

(56) References Cited

U.S. PATENT DOCUMENTS 9,710,936 B2 *   7/2017   Schretter ................ A61B 6/542
11,928,893 B2 *  3/2024   Luo ........................ G06V 10/82
(Continued)

OTHER PUBLICATIONS

"International Search Report" in PCT/IB2020/061379, dated Mar. 11, 2021.
(Continued)

*Primary Examiner* — Tsung Yin Tsai
(74) *Attorney, Agent, or Firm* — William H. Bollman

(57) ABSTRACT

The present invention relates to training data sets and a system and method for generating training images especially those which are medical images. Especially disclosed is a method of training a machine learning model to recognize movement of a body part in an acquired medical image The machine learning model is trained by varying/modifying a blur convolution kernel constructed with pixels oriented in a direction of the movement; the method including determining at least one motion weighting factor corresponding to a motion time period when the body part is moving during acquisition of the medical image, and using the motion weighting factor to vary/modify the blur convolution kernel.

19 Claims, 4 Drawing Sheets

Image acquisition time ⟶

Image acquisition time ⟶

(56) References Cited

U.S. PATENT DOCUMENTS

| | | | | |
|---|---|---|---|---|
| 2016/0005194 | A1* | 1/2016 | Schretter | G06T 11/005 |
| | | | | 378/4 |
| 2017/0147081 | A1* | 5/2017 | Kwon | G06T 7/20 |
| 2020/0335199 | A1* | 10/2020 | Accomazzi | G06F 16/27 |
| 2021/0256680 | A1* | 8/2021 | Xie | G06N 3/063 |
| 2022/0076002 | A1* | 3/2022 | Luo | G06V 40/28 |
| 2023/0017138 | A1* | 1/2023 | Francis Knowles-Barley | |
| | | | | G06T 7/20 |

OTHER PUBLICATIONS

"Written Opinion of the International Searching Authority" in PCT/IB2020/061379, dated Mar. 11, 2021.

Chen, Huaijin et al., "Reblur2Deblur: Deblurring videos via self-supervised learning", 2018 IEEE Intl. Conf. on Computational Photography (ICCP), IEEE, May 4, 2018.

Sun, Jian et al., "Learning a convolutional neural network for non-uniform motion blur removal", 2015 IEEE Conf. on Computer Vision and Pattern Recognition (CVPR), IEEE, Jun. 7, 2015.

Cronje, Jaco, "Deep convolutional neural networks for dense non-uniform motion deblurring", 2015 Intl IEEE Conf. on Image and Vision Computing New Zealand (IVCNZ), IEEE, Nov. 23, 2015.

Boracchi, G. et al., "Modeling the Performance of Image Restoration From Motion Blur", IEEE Transactions on Image processing, IEE Service Center, Piscataway, NJ, US, vol. 21, No. 8, Aug. 2012.

* cited by examiner

SYSTEM AND METHOD FOR GENERATING TRAINING IMAGES

FIELD OF THE INVENTION

The present invention relates to the field of artificial intelligence, machine learning and data sets. In particular it relates to training data sets and a system and method for generating training images. More particularly it relates to training images which are medical images.

BACKGROUND

Machine learning is a discipline within the field of artificial intelligence (AI) whereby a computer is trained via detection, analysis and observation of patterns and trends in data, and iteratively improves on decisions in subsequent and non-identical situations.

Ideally data comprises discrete sets, for example, a first set suitable for training and building a model (the term 'model' is used here to mean the mathematical expression of a process); a second set for validating the model, that is, estimating the 'skill' of the model during training; and a third set to test to evaluate the final performance of the model.

Data sets per se can be flawed. For example, data sets, and training data sets are collected and designed according to the target attribute or identified problem. As such they can be biased towards the population they are collected from and can include 'outliers' or non-relevant data points.

In 'FlowNet: Learning Optical Flow with Convolutional Networks.' (2015) P. Fischer et al described methods useful for estimating the optical flow of 3D objects in a scene as captured by a natural images or videos where light is reflected off the surfaces of objects. They note that while convolutional neural networks (CNNs) are successful in a variety of computer vision tasks, especially on tasks linked to recognition, they are not successful in optical flow estimation. They consequently construct appropriate CNNs which are capable of solving the optical flow estimation problem as a supervised learning task, comparing two architectures (a generic architecture and an architecture that includes a layer that correlates feature vectors at different image locations). In the absence of an existing ground truth dataset large enough to train a CNN, they generate a synthetic Flying Chairs dataset and show that networks trained on the unrealistic data still generalize well compared to existing datasets such as Sintel and KITTI, achieving competitive accuracy (at frame rates of 5 to 10 fps).

D Gong et al ('From Motion Blur to Motion Flow: a Deep Learning Solution for Removing Heterogeneous Motion Blur,' 2D16)) describe how removing pixel-wise heterogeneous motion blur is challenging due to the ill-posed nature of the problem, the fact that the predominant solution to estimating the blur kernel (by adding a prior) is problematic (because of difficulty in identifying a prior which is suitably informative) and that learning a prior over the latent image requires modeling all possible image content. They thus propose that learning the motion flow instead allows a model to focus on the cause of the blur, irrespective of the image content and they present a deep learning based method for estimating and removing heterogeneous motion blur whereby the heterogeneous motion blur is represented as pixel-wise linear motion blur. The proposed method uses a fully-convolutional deep neural network (FCN) to estimate a dense motion flow map for blur removal. The method automatically generates training data with simulated motion flow maps for training the FCN. Thus, for ease, they avoid the iterative process through which latent image priors are typically applied and the method presented is thus useful for estimating the optical flow due to camera motion or object motion blur from 2D natural images where light is reflected off the surface of objects.

However, the methods described by Fischer and Gong do not address the type of optical flow observed medical images where images are based on x-rays passing through a body part of interest.

A. Zhao et al (Data Augmentation Using Learned Transformations for One-shot Medical Image Segmentation, 2019) note how, while generally highly accurate, image segmentation methods based on CNNs rely on supervised training with large labeled datasets, that labeling medical images requires significant expertise and time, but that typical hand-tuned approaches for data augmentation fail to capture the complex variations in such images. They present an automated data augmentation method for synthesizing labeled medical images and demonstrate the method on the task of one-shot biomedical image segmentation on magnetic resonance imaging (MRI) brain scans. This one-shot segmentation task takes a labeled reference volume and an unlabeled volume as input and outputs the same labeling (or segmentation) applied to the unlabeled volume. The method requires a single segmented scan and leverages other unlabeled scans in a semi-supervised approach. A model of transformations is learned from the images, and the model is used along with the labeled example to synthesize additional labeled examples. Each transformation comprises a spatial deformation field and an intensity change, enabling the synthesis of complex effects such as variations in anatomy and image acquisition procedures. The method demonstrates how, for one-shot biomedical segmentation, training a supervised segmentation model on synthesized examples provides significant improvements over state-of-the-art methods, on volumetric MRI data However, the method does not address or synthesize motion blur (only anatomical and appearance differences between subjects are synthesized, and only general spatial blurring is used to smooth synthesized images). Nor does the method address the type of optical flow observed in projections of x-rays passing a body part of interest (full volumetric data used).

With reference to motion blur in a medical image, the characteristics and composition of a body part varies and therewith the respective appearance of blur in an image Motion blur is also difficult to annotate accurately and therefore contains a large amount of uncertainty. However, the characteristics of motion blur in images selected for a training set are predetermined or known to have little or no blur present; and the amount of motion blur applied in a synthetic data set is known with no uncertainty.

A further problem is that once training is complete a model is constant and adapted to the properties of the training data set. For example, a model trained an synthetic motion blur applied at constant velocities may only be able to detect motion blur occurring at constant velocities.

Existing methods for synthetic data generation include simulating camera motion at constant velocities throughout image acquisition. This type of synthetic blur is not appropriate for medical images, where the major source of blur is from the motion of the body part being imaged, and image acquisition limes can be much longer than those of normal cameras.

The present invention resolves such problems. It provides a system and method to generate training data wherein the attributes of the training data are more realistic and motion velocity is non-uniform.

It is a further advantage of this invention that the velocity of motion blur does not have to be constant. For example, the motion blur model can include representation of acceleration and deceleration in motion blur.

SUMMARY OF THE INVENTION

According to a first aspect of the invention there is a method of training a machine learning model to recognise movement of a body part in an acquired medical image by varying/modifying a blur convolution kernel constructed with pixels oriented in a direction of the movement; the method includes determining at least one motion weighting factor corresponding to a motion time period when the body part is moving during acquisition of the medical image, and using the motion weighting factor to vary/modify the blur convolution kernel.

As a real image of a moving body part would have pixels which do not change while the body part is stationary and do change while the body part is moving, the machine learning model can be taught to recognize these changes. Since the changes depend on the movement, linear. wavy, etc., the image pixels can be modified accordingly to most effectively simulate changes which are due to the movement. Changes which are due to movement of the body part and/or a region of interest in the body part may be simulated. The acquired medical image may be based on x-rays passing through the body part.

Preferably simulated images are used to train the machine learning model to recognise body part movement in real medical images. The method of training the machine learning model may include convolving a real sharp image with a convolutional kernel oriented in the direction of movement to generate a simulated motion blur training image and corresponding simulated ground truth movement vector field The sharp image may be a training image for the machine learning model, along with corresponding ground truth vector field encoding no movement. The machine learning model may learn from a simulated image, along with the simulated ground truth motion vector field, in order to train the machine learning model to recognise real movement in a real medical image.

The training image may be a medical image, for example a medical image of a body part. The body part may be a breast, a lung, a liver or other body organ or other body part.

Particular characteristics of the medical image are modelled. For example, motion blur in the direction of movement may be visible as an area of blurred lines oriented in the direction of the movement. Motion blur may be simulated by convolving a sharp image with a motion blur convolutional kernel oriented in the direction of motion. Thus the characteristics of the medical image relate to the movement of the body part during the imaging process and resultant image motion blur. In this way the simulated training data is generated with realistic attributes, and the machine learning system learns to identify real motion blur.

A temporal weighting may be added to the pixels, or a kernel value associated with each respective pixel in the convolution kernel to simulate body part motion, where the body part is moving for part of the duration of the image acquisition. The method of training a machine learning model may include scaling the motion weighting factor proportional to the motion time period. If the motion time period is short for example, the change in the real image would be correspondingly small, and so the machine learning model takes this into consideration when learning to recognise movement.

Accordingly, the method of training the machine learning model may include scaling the motion weighting factor inversely proportional to an imaging time period during which the medical image is acquired. When the motion time period is a relatively small fraction of the total image acquisition period, the model can learn to recognize that relatively small changes to the pixels could indicate motion in this situation. Similarly the motion weighting factor may be scaled inversely proportional to a motion distance which is how far the body part moves during the motion time period.

The method of training a machine learning model may include scaling the motion weighting factor directly proportional to an imaging resolution measure in length per pixel. Preferably the motion blur convolution kernel pixels are oriented in a line. An imaging resolution that is fine will have a value that is correspondingly small compared to a resolution that is coarse. So the machine learning model may be trained to recognize the even relatively small changes in the pixels or kernel values associated with the pixels may indicate movement when the imaging resolution is relatively fine.

Movement of one or more body parts may be modelled as partly stationary and partly moving during the imaging process. This results in a weighted motion blur vector field comprising different convolution kernel values for each corresponding part of the image.

The method of training the machine learning model may include determining a first static weighting factor corresponding to a first static time period when the body part is motionless during acquisition of the medical image and using the first static weighting factor to vary the blur convolution kernel. There may also be second, third, fourth, etc. static time periods also. So advantageously the machine learning model may learn to recognise stepped movement. The term 'stepped movement' is used here to mean a movement where the body part is moving during part of the image acquisition time and is stationary for remainder of the image acquisition time. This is modelled by a varying blur convolution kernel with two or more different weighting factors, corresponding to each stationary or 'static' period, and each motion period. Multiple motion events may be added to the same blur convolution kernel. For example, an additional static weighting factor and motion weighting factor is added to the blur convolution kernel.

The static weighting factor may be scaled proportional to the static time period and inversely proportional to an imaging time period during which the medical image is acquired.

Preferably the method of training the machine learning model includes constructing the blur convolution kernel as an array in which each one of the pixels is associated with a respective kernel value. So the array may be stored and used as digital numbers in a system designed to train the machine learning model comprising for example. a digital electronic convolution engine; weighting factor calculator, digital image memory device and interface with the convolution engine; convolution kernel memory; and/or digital data processor.

The method of training the machine learning model may include modifying the blur convolution kernel by using at least one weighting factor to modify at least one kernel value.

Preferably the method of training the machine learning model includes arranging the motion blur convolution kernels over a single vector field describing the magnitude of motion at each pixel in the image. To train the machine learning model to recognize a second movement at the same time, a second motion blur convolution kernel may arranged over a second vector field. So advantageously any combination of movements can be recognized by the machine learning model.

Curved motion can be modelled by curving the resulting weighted kernel. The method of training the machine learning model may include arranging the pixels to make the line curved where the movement is curved to curve the blur convolution kernel. For example wavy movement which is typical of vibration such as heartbeat repetition or breathing repetition can quickly be recognized by the machine learning model.

The method of training the machine learning model may be trained to recognize the movement as constant motion may include modifying kernel values of respective pixels by an equal amount for all the pixels in the line. The term 'constant movement' is used here to refer to continuous movement, for example. linear movement may be at a constant speed and wavy or curved movement may be a constant frequency.

Constant movement may be modelled by a line that is weighted the same throughout the length of the line. For example, the method of training the machine learning model may include modifying the kernel values of the respective pixels in the line to be equal to the motion weighting factor or a scaled proportion of the motion weighting factor So all the kernel values in the line may be equal.

The model may be trained recognize the movement to be continuing when the image acquisition time ends. To do this at least one of the static weighting factors may be scaled to be equal to the final motion weighting factor. Preferably a kernel value of a kernel pixel corresponding to a respective static time period is equal to the kernel value of the final kernel pixel corresponding to the motion time period. Movement may be learned to be recognized when it endures for the start to finish of the image acquisition time.

If the constant movement only endures during a motion time period, then only the pixels associated with the motion time period may all have equal kernel values. For example the model may be trained to recognize the movement as motion characterised by the static lime period followed by the motion time period including using the static weighting factor to modify a kernel value of at least one pixel on a first portion of the line Preferably the static weighting factor is used to modify the kernel value of only the first pixel in the line. A proportion of the static weighting factor may be added to the kernel value of at least one pixel on the first portion. The resulting kernel weights are scaled so that the motion blur convolution kernel values sum to 1.

A first proportion of the motion weighting factor may be added to the pixels on the first portion of the line. In this way the at least one pixel on the first portion of the line is associated with the motion time period while the body part is static. This helps the machine learning model to recognise the stationary period of stepped movement when there is a combination of no movement and full speed movement. For example, the first proportion may be in the range of a quarter to three quarters of the full motion weighting factor, when the body part is stationary for a quarter to three quarters of the image acquisition time.

The motion weighting factor may be used to modify a kernel value of at least one pixel on a second portion of the line following the first portion. In this way the at least one pixel an the second portion of the line is associated with the motion time period and the movement of the body part during the motion time period. This helps the machine learning model to recognise the moving period of stepped movement when there is a combination of no movement and full speed movement. The resulting kernel weights are scaled so that the motion blur convolution kernel values sum to 1.

A second, third or fourth static weighting factor, etc. may be determined each for a respective second, third or fourth respective static time period. There may also be second, third or fourth, motion time period. etc. for a respective second, third or fourth respective motion time period. The second motion time period intermediate the second and third time periods; the third motion time period intermediate the third and fourth time period, and so on.

For example, a second static weighting factor corresponds to the second static time period when the body part is motionless during acquisition of the medical image. The first static time period leads to the motion time period which leads the second and last static time period. The second static weighting factor may be used to vary/modify the blur convolution kernel. Then the motion weight of the motion period intermediate the first and second static time periods may be used to modify respective kernel values of the first pixel and last pixel. The resulting kernel weights are scaled so that the motion blur convolution kernel values sum to 1.

The method of training the machine learning model may also take account of a first motion time period when the body part is accelerating horn a first speed to a second speed. Body part acceleration and deceleration are modelled in the formation of the convolution kernel. So advantageously. one or more models of one or more of the characteristics of the medical image can represent motion occurring at different velocities and a combination of different velocities.

For example at least one motion weighting factor may be adapted to correspond to a first motion time period when the body part is accelerating from the first speed to the second speed. A kernel value of a pixel associated with the time period immediately before the first motion period may be scaled to be greater than a kernel value of a pixel associated with the first motion time period. Similarly, the kernel value of the pixel associated with the first motion time period may be scaled to be greater than a kernel value of a pixel associated with the time period immediately after the first motion period. This results in gradual weighting factor changes during transition from stationary to motion time periods.

According to a second aspect of the invention there is a system designed to train a machine learning model to recognise movement of a body part in an acquired medical image comprising. a convolution engine to train the machine learning model; a convolution kernel constructor to construct and modify a blur convolution kernel constructed with pixels oriented in a direction of the movement: and a weighting factor calculator to determine at least one motion weighting factor corresponding to a motion time period when the body part is moving during acquisition of the medical image. wherein the convolution kernel constructor is configured to use the motion weighting factor to modify the blur convolution kernel.

The system may comprise a digital image memory device with an interface with the convolution engine to store and transfer digital data representing a sharp image to be convolved with the pixels by the convolution engine. The interface of the digital image memory device the convolution engine may comprise an Internet pathway.

The system may be arranged to generate at least one training image, including a line with which the pixels oriented in a direction of the movement are associated, and/or the sharp image to be convolved with the pixels. The training image may be a medical image, for example a medical image of a body part. The body part may be a breast, a lung a liver or other body organ or other body part.

The system may comprise a convolution kernel memory and interface with the convolution kernel constructor and the convolution engine configured to store the blur convolution kernel as an array constructed by convolution kernel constructor and transfer the array to the convolution engine. The convolution engine may comprise a digital data processor hardwired and programmed to convolve digital data representing the sharp image with the pixels by the convolution engine.

The invention will now be described, by way of example only, with reference to the accompanying figures in which:

DETAILED DESCRIPTION OF THE INVENTION

In an illustrative embodiment movement of body parts during imaging results in motion blur in 2D medical images.

Figure 1:
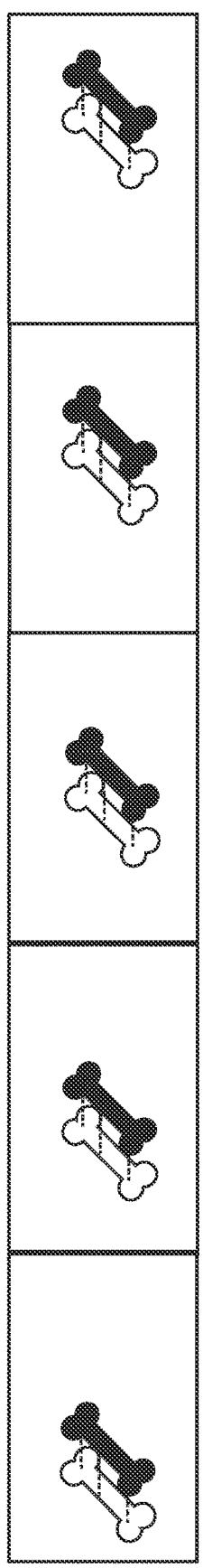
FIG. 1 shows constant movement throughout the image acquisition process.

For example, a constant movement model assumes body part movement is constant throughout the image acquisition process, as illustrated by FIG. 1.

Figure 2:
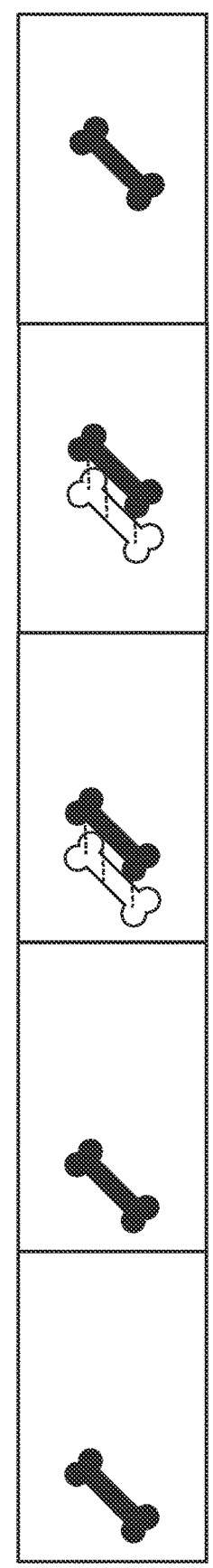
FIG. 2 shows stepped movement during part of the image acquisition process.

A stepped movement where the body part is moving during part of the image acquisition time and is stationary for remainder of the image acquisition time is illustrated by FIG. 2.

Figure 3:
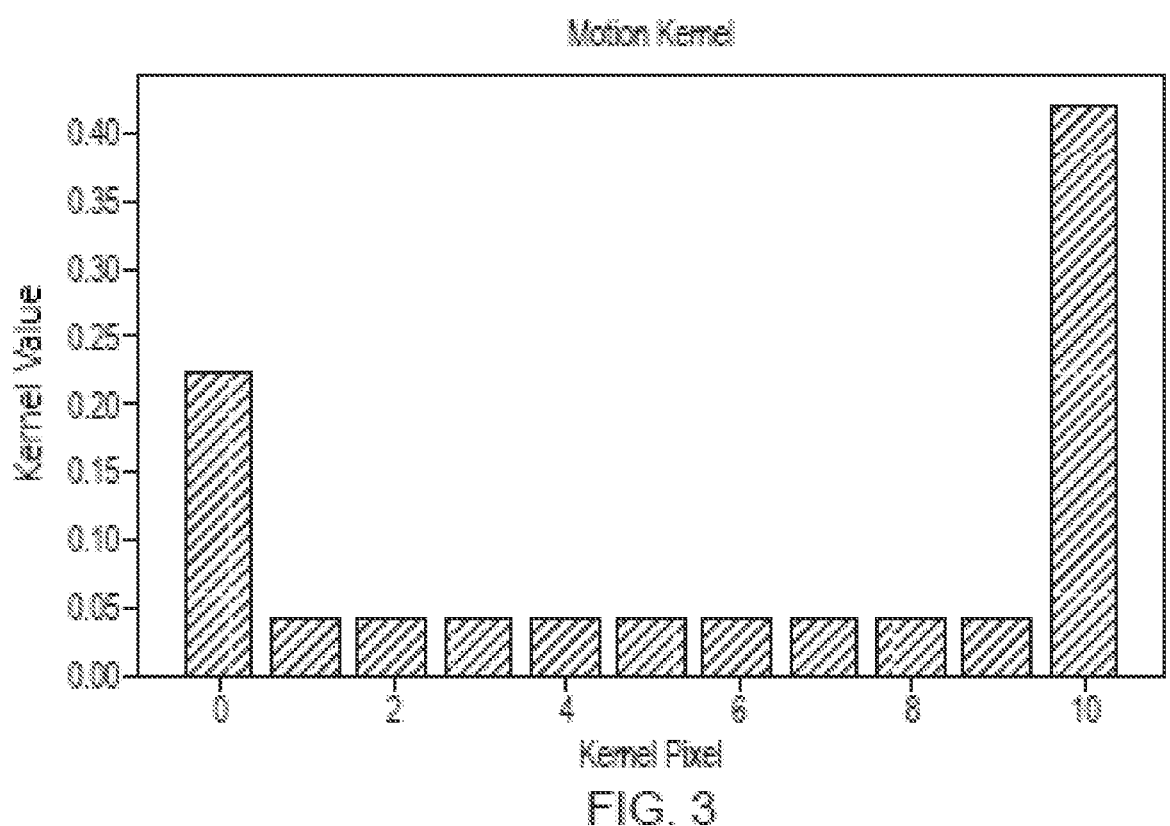
FIG. 3 shows an example of a temporally weighted convolution kernel.
Figure 4:
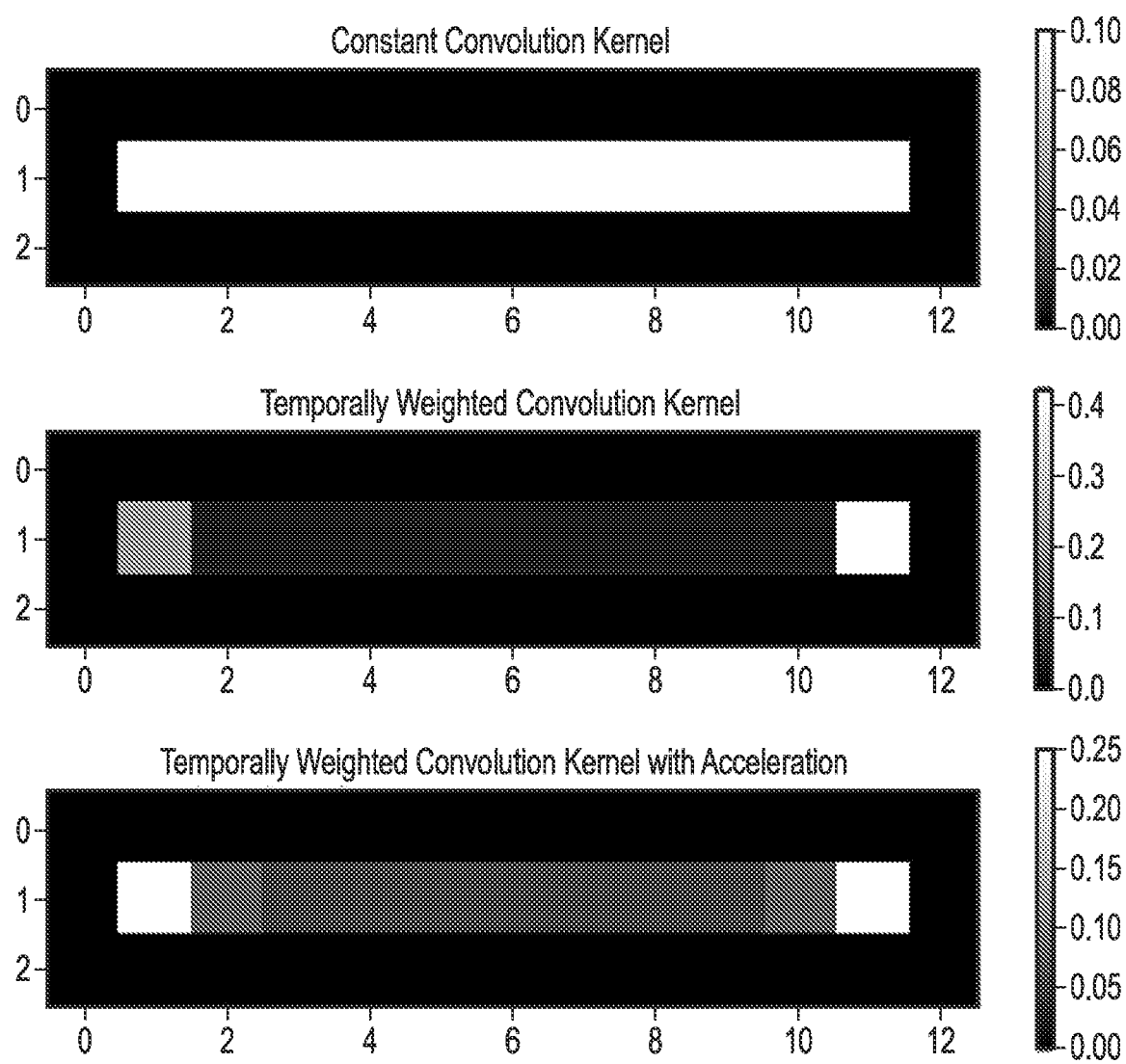
FIG. 4 shows examples of straight-line constant weight, temporally weighted, and temporally weighted with acceleration convolution kernels.

This is modelled by varying blur convolution kernel with two or more different weighting factors including, static weighting factors corresponding to each respective stationary or 'static' period, and motion weighting factors corresponding to each respective motion period, as depicted in FIG. 3 and FIG. 4 (middle).

Figure 5:
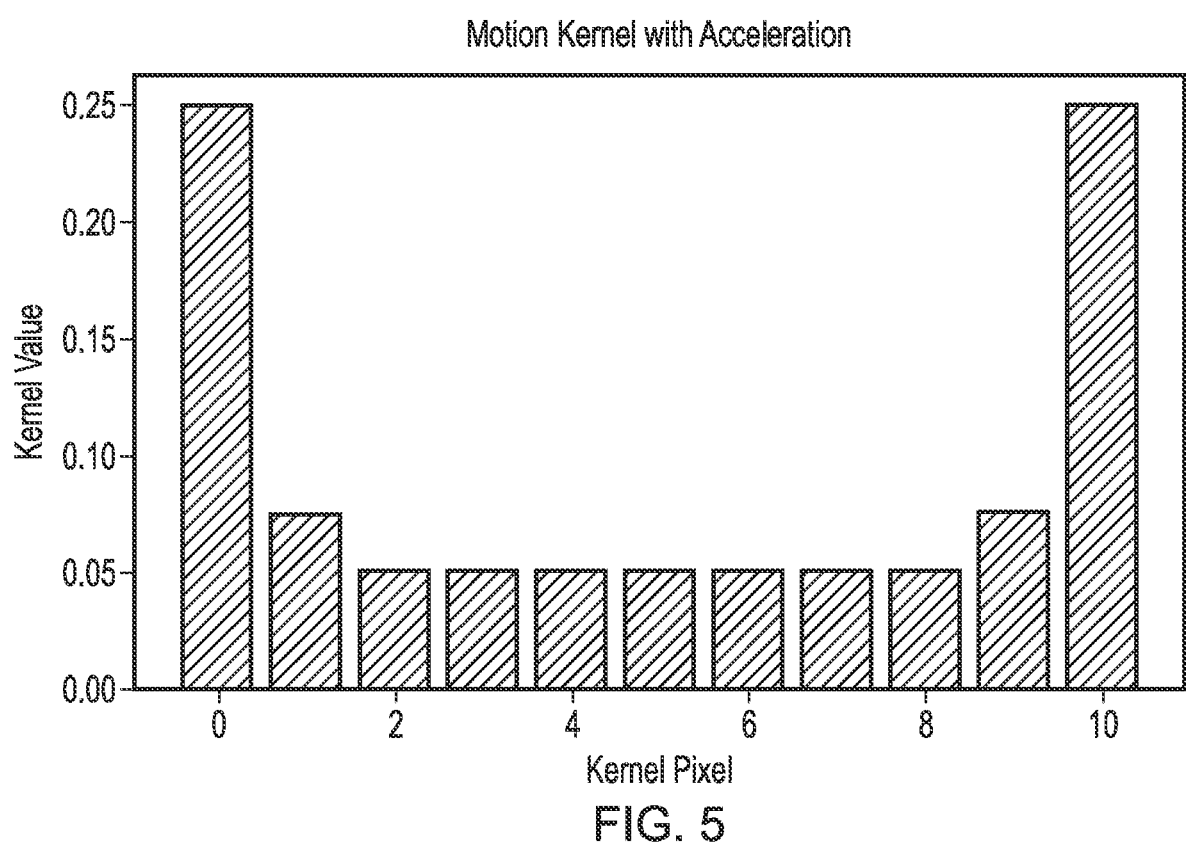
FIG. 5 shows a temporally weighted motion kernel with acceleration.

With the additional aspect of modelling the acceleration and deceleration of the body part, the convolution kernel becomes smoothly varying between weighted regions, as depicted in FIG. 4 (bottom) and FIG. 5.

In FIG. 3 and FIG. 5. kernel values are on the ordinate axis. The abscissa is labelled the kernel pixel. The blur convolution kernel comprises array of each kernel value paired with each respective kernel pixel. The figures show a weighted motion blur vector field comprising different convolution kernel values for each corresponding part of the image.

A first example explains a method of modelling movement of one or more body parts. In the example an imaging time is between 1.0 and 2.0 seconds. During the imaging time, a body part starts as stationary then the body moves and is stationary again For the purposes of the illustrative example, imaging time is 1.5 seconds, the body part is stationary for 0.3 seconds, the body part moves 0.7 mm over 0.6 seconds, and the body part is then stationary for 0.6 seconds. Motion blur can be modelled by determining a blur convolution kernel as follows.

Imaging resolution: 0.07 mm per pixel

Static weighting factor 1 =

$$\text{stationary time/imaging time} = 0.3 \text{ s}/15 \text{ s} = 0.2$$

Motion weighting factor =

$$\text{motion time/imaging time/motion distance} * \text{imaging resolution}$$

$$= 0.6 \text{ s}/1.5 \text{ s}/0.7 \text{ mm} * 0.07 \text{ mm} = 0.04$$

Static weighting factor 2 =

$$\text{stationary time/imaging time} = 0.5 \text{ s}/1.5 \text{ s} = 0.4$$

Kernel Construction:

First pixel kernel value=(Static weighting factor 1)+0.5*(Motion weighting factor)=0.22

Motion pixels kernel values=Motion weighting factor=0.04

Last pixel kernel value={Static weighting factor 2}+0.5*(Motion weighting factor)=0.42

A temporally weighted blur convolution kernel in which each kernel pixel is assigned a pixel weight according to the kernel construction of the first example above is illustrated in FIG. 3. This is an example of a weighted motion blur convolution kernel comprising different kernel values for each corresponding part of the kernel. The Kernel value is 0.22 for the First pixel which is labeled as Kernel pixel 0. The Kernel value is 0.04 for the Motion pixels labeled as Kernel pixels '1' to '9'. The Kernel value is 0.42 for the Last pixel which is labeled as Kernel pixel '10'. The motion blur convolution kernel values sum to 1.

As FIG. 3 shows the method results in a weighted motion blur vector field comprising different convolution kernel values for each corresponding part of the image. There are static pails with respective first and last kernel pixels having respective first and last kernel values. There is a motion part with respective motion kernel pixels having respective motion kernel values.

For random initialization of kernel values, integration of the Motion weighting factor into first and last pixels can be assumed as long as the first static weighting factor is greater than or equal to half the motion weighting factor and the second or last static weighting factor is also greater than or equal to half the motion weighting factor. Expressed mathematically: (Static weighting factor 1)>=0.5*Motion weighting factor, and (Static weighting factor 2)>=0.5*Motion weighting factor With reference to FIG. 3, the weighted motion blur kernel has two static weighting factors corresponding to stationary periods, separated by a series of movement weighting factors corresponding to the time the body part was in motion.

With reference to FIG. 4, examples are shown of straight-line constant weight and temporally weighted blur convolution kernels. Whereas FIG. 3 shows kernel values as bar heights for each pixel number of the blur convolution kernel, FIG. 4 shows the kernel values for each pixel according to a shaded scale.

In FIG. 4 Top Shaded Scale there is an illustration of a constantly weighted convolution kernel that approximates constant motion throughout the imaging time. The motion time equals the imaging time. All the pixels are motion pixels. A second example showing determination of kernel values for the motion pixels is as follows:

For the purposes of the illustrative example, imaging time is 1.0 s, modelling constant movement of a body part moving 0.7 mm over the 1.0 s.

Imaging resolution: 0.07 mm per pixel

Motion weight factor := motion time/imaging time/motion distance $*$ imaging resolution $= 1.0$ s/1.0 s/0.7 mm $* 0.07$ mm $= 0.1$ Motion pixels kernel values = Motion weighting factor = 0.1

In FIG. 4 Middle Shaded Scale there is an illustration of the temporally weighted blur convolution kernel that has three weighted regions previously described by the first example above and illustrated in FIG. 3. Single pixels at the left and right of the kernel correspond with time spent stationary and have a higher weight than the pixels in between, which correspond to the time the body part is in motion.

In FIG. 4 Bottom Shaded Scale there is an illustration of a temporally weighted blur convolution kernel that models a combination of stationary and moving phases, with the addition of acceleration and deceleration at the start and end of motion, resulting in gradual weight changes between stationary and motion phases. The temporally weighted convolution kernel which is illustrated in the FIG. 4 Bottom Shaded Scale is determined as explained by a third example below.

In the third illustrative example, a simple time step acceleration model (using the Euler method) is used to model a constant acceleration of 2 mm/s$^2$ for a first interval of 0.4 s, followed by constant motion for a second interval 0.6 s and a constant deceleration of 2 mm/s$^7$ for a third interval 0.4 s along with 0.1 s stationary at both the start and end of the movement. The simple acceleration model is used to generate a smoothly varying convolution kernel as follows.

Imaging resolution 0.08 mm per pixel
Timing resolution=0 1 s per time point
Acquisition time=1.7 s
Acceleration (mm per s$^2$)=[0, 0, 2, 2, 2, 2, 0, 0, 0, 0, 0, 0. −2, −2. −2, −2. 0] mm/s$^2$
Acceleration (pixels per 0.1 s$^2$)=[0, 0, 0.25. 0.25, 0.25. 0.25, 0, 0, 0. 0, 0.25, 0.25, 0.25, 0.25, 0]
Speed (pixels per 0.1 s$^2$)=[0.0, 0.0, 0.25, 0.5, 0.75. 1.0. 1.0, 1.0, 1.0, 1.0. 1.0, 1.0, 0.75. 0.5, 0.25. 0.0]
Location (pixel)=[0.0, 0.0, 0.25. 0.75, 1.5, 2.5, 3.5, 4.5, 5.5. 6.5. 7.5. 8.5, 9.25, 9.75, 10.0, 10.0]
Time Weighted Kernel (time at pixel per 0.1 s)=[5. 1.5, 1, 1. 1. 1, 1, 1, 1. 1.5, 5]
Scaled Kernel Value (normalized to sum to 1)=[0.25, 0, 0.75, 0.05, 0.05, 0.05, 0.05, 0.05. 0.05, 0.05, 0.075, 0.25]

FIG. 5 snows kernel values as bar heights for each pixel number of a convolution kernel whereas FIG. 4 Bottom Shaded shows the kernel values according to a shaded scale. So FIGS. 4 and 5 show that the kernel has two static weighted kernel values corresponding to respective stationary periods, separated by a series of movement weighted kernel values corresponding to the time the body part was in motion, including periods of acceleration and deceleration. The blur convolution kernel values sum to 1.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

The invention claimed is:

1. A method of training a machine learning model to recognize movement of a body part in an acquired medical image by modifying a blur convolution kernel constructed with pixels oriented in a direction of the movement; the method comprising:
   determining at least one motion weighting factor corresponding to a motion time period when the body part is moving during acquisition of the medical image, and using the motion weighting factor to vary/modify the blur convolution kernel, wherein
   at least one motion weighting factor corresponds to a first motion time period when the body part is accelerating from a first speed to a second speed, and scaling a kernel value of a pixel associated with the time period immediately before the first motion period to be greater than a kernel value of a pixel associated with the first motion time period.

2. The method of training a machine learning model according to claim 1, further comprising:
   scaling the motion weighting factor directly proportional to an imaging resolution measure in length per pixel in a line of the pixels.

3. The method of training the machine learning model according to claim 1, further comprising:
   determining a first static weighting factor corresponding to a first static time period when the body part is motionless during acquisition of the medical image and using the static weighting factor to vary the blur convolution kernel.

4. The method of training the machine learning model according to claim 3, comprising:
   scaling the static weighting factor proportional to the static time period and inversely proportional to an imaging time period during which the medical image is acquired.

5. The method of training the machine learning model according to claim 3, further comprising:
   training the model to recognize the movement as motion, wherein
   the static time period followed by the motion time period includes using the static weighting factor to modify a kernel value of at least one pixel on a first portion of the kernel.

6. The method of training the machine learning model according to claim 5, wherein:
   the static weighting factor is used to modify the kernel value of only the first pixel in the kernel.

7. The method of training the machine learning model according to claim 3, further comprising:
   training the model to recognize the movement to be continuing when the image acquisition time ends by scaling the at least one of the static weighting factors to be equal to the final motion weighting factor.

8. The method of training the machine learning model according to claim 1, further comprising:
constructing the blur convolution kernel as an array in which each one of the pixels is associated with a respective kernel value.

9. The method of training the machine learning model according to claim 1, further comprising:
convolving a sharp image with the blur convolutional kernel oriented in the direction of movement to generate a simulated motion blur training image.

10. The method of training the machine learning model according to claim 1, further comprising:
scaling the kernel value of a pixel associated with the first motion time period to be greater than a kernel value of a pixel associated with the time period immediately after the first motion period.

11. A method of training a machine learning model to recognize movement of a body part in an acquired medical image by modifying a blur convolution kernel constructed with pixels oriented in a direction of the movement, the method comprising:
determining at least one motion weighting factor corresponding to a motion time period when the body part is moving during acquisition of the medical image, and using the motion weighting factor to vary/modify the blur convolution kernel;
determining a first static weighting factor corresponding to a first static time period when the body part is motionless during acquisition of the medical image and using the static weighting factor to vary the blur convolution kernel;
training the model to recognize the movement as motion, wherein the static time period followed by the motion time period includes using the static weighting factor to modify a kernel value of at least one pixel on a first portion of the kernel; and
using the motion weighting factor to modify a kernel value of at least one pixel on a second portion of the kernel following the first portion.

12. The method of training the machine learning method according to claim 11, further comprising:
adding a first proportion of the motion weighting factor to the pixels on the first portion of the kernel.

13. The method of training the machine learning method according to claim 12, wherein:
the first proportion is equal to the fraction of time during acquisition of the image that the body part is motionless; and
a second proportion of the motion weighting factor added to pixels on a second portion of the line is larger than the first proportion.

14. A method of training a machine learning model to recognize movement of a body part in an acquired medical image by modifying a blur convolution kernel constructed with pixels oriented in a direction of the movement, the method comprising:
determining at least one motion weighting factor corresponding to a motion time period when the body part is moving during acquisition of the medical image, and using the motion weighting factor to vary/modify the blur convolution kernel;
determining a first static weighting factor corresponding to a first static time period when the body part is motionless during acquisition of the medical image and using the static weighting factor to vary the blur convolution kernel; and
determining a second static weighting factor corresponding to a second static time period when the body part is motionless during acquisition of the medical image, in which the first static time period leads to the motion time period which leads to the second static time period, and using the second static weighting factor to vary the blur convolution kernel.

15. The method of training the machine learning model according to claim 14, further comprising:
using the motion weighting factor to modify respective kernel values of the first pixel and last pixel.

16. The method of training the machine learning model according to claim 14, further comprising:
scaling the first static weighting factor to be greater than or equal to half the motion weighting factor and scaling the second static weighting factor to be greater than or equal to half the motion weighting factor.

17. A system designed to train a machine learning model to recognize movement of a body part in an acquired medical image comprising:
a convolution engine to train the machine learning model;
a convolution kernel constructor to construct and modify a blur convolution kernel constructed with pixels oriented in a direction of the movement; and
a weighting factor calculator to determine at least one motion weighting factor corresponding to a motion time period when the body part is moving during acquisition of the medical image, wherein
the convolution kernel constructor is configured to use the motion weighting factor to modify the blur convolution kernel, and
at least one motion weighting factor corresponds to a first motion time period when the body part is accelerating from a first speed to a second speed, and scaling a kernel value of a pixel associated with the time period immediately before the first motion period to be greater than a kernel value of a pixel associated with the first motion time period.

18. The system designed to train the machine learning model according to claim 17, further comprising:
a digital image memory device with an interface with the convolution engine to store and transfer digital data representing a sharp image to be convolved with the pixels by the convolution engine.

19. The system designed to train the machine learning model according to claim 17, wherein the convolution engine comprises a digital data processor hardwired and programmed to convolve digital data representing the sharp image with the pixels by the convolution engine.

* * * * *